United States Patent [19]
Pullen et al.

[11] Patent Number: 5,867,221
[45] Date of Patent: Feb. 2, 1999

[54] METHOD AND SYSTEM FOR THE FRACTAL COMPRESSION OF DATA USING AN INTEGRATED CIRCUIT FOR DISCRETE COSINE TRANSFORM COMPRESSION/DECOMPRESSION

[75] Inventors: David Pullen, Dunwoody; Brad Howard, Doraville; Gang Liang, Norcross, all of Ga.

[73] Assignee: Interated Systems, Inc., Atlanta, Ga.

[21] Appl. No.: 623,997

[22] Filed: Mar. 29, 1996

[51] Int. Cl.$^6$ .............................. H04N 7/28; H04N 7/50
[52] U.S. Cl. ............................................ 348/417; 382/253
[58] Field of Search .................................... 348/390, 400, 348/405, 417, 418, 422, 699; 382/248, 249, 250, 253; H04N 7/50, 7/28

[56] References Cited

U.S. PATENT DOCUMENTS

| | | | |
|---|---|---|---|
| 4,941,193 | 7/1990 | Barnsley | 382/249 |
| 5,105,271 | 4/1992 | Niihara | 348/699 |
| 5,214,504 | 5/1993 | Toriu | 348/407 |
| 5,432,556 | 7/1995 | Hatano | 348/390 |
| 5,457,495 | 10/1995 | Hartung | 348/418 |
| 5,477,272 | 12/1995 | Zhang et al. | 348/407 |
| 5,576,772 | 11/1996 | Kondo | 348/416 |

FOREIGN PATENT DOCUMENTS 9520296  7/1995  WIPO .

OTHER PUBLICATIONS

*Tree–Structured Scene Adaptive Coder,* Peter Strobach, *IEEE Transactions on Communications,* vol. 38, No. 4, Apr. 1990, pp. 477–486.
*Rate–Distortion Optimized Motion Compensation For Video Compression Using Fixed Or Variable Size Blocks,* Gary J. Sullivan and Richard L. Baker, *Globcom'91,* pp. 85–89.
*Low Rate Coding Of Moving Images Using Motion Compensation, Vector Quantization, and Quadtree Decomposition,* Gary J. Sullivan, Ph.D., Dissertation, UCLA School of Engineering and Applied Science (Aug. 1991), Department of Electrical Engineering.
*Multimedia Processor Architecture MPA System Design Guide,* Intergrated Information Technology, Inc. (IIT), Rev. 2.4, Nov. 1995.
*IIT VCP Single Chip Video Codec and Multimedia Communications Processor,* Integrated Information Technology, Inc., Datasheet, Rev. 1.31, Nov. 1995.
*Efficient Quadtree Coding of Images And Video,* Gary J. Sullivan and Richard L. Baker, *IEEE,* pp. 2661–2664.
*Efficient Quadtree Coding of Images And Video,* Gary J. Sullivan and Richard L. Baker, *IEEE Transactions On Image Processing,* vol. 3, No. 3, May 1994, pp. 327–331.

*Primary Examiner*—Howard Britton
*Attorney, Agent, or Firm*—Morris, Manning & Martin, L.L.P.

[57] ABSTRACT

A system and method for compressing related data sets of a sequence are disclosed. The process compares domain blocks from a current frame buffer to range blocks in a previous frame buffer or vector quantization ("VQ") tables to generate affine map codes. The affine map codes are preferably encoded by an entropy encoder before being transmitted to a remote site for decompression. The cost for the encoded affine map codes are computed and used to determine whether affine map codes for representing smaller blocks should be included in the affine map codes which represent the domain blocks into which the original frame was segmented. The methods are preferably implemented on a commercially available discrete cosine transform ("DCT") processor having a process controller and a data comparator. The results of the affine map code generating process on the DCT processor achieves a more consistent bit rate and image quality than methods operating the DCT processor to generate DCT codes.

34 Claims, 8 Drawing Sheets

| 1 | 4 | 7 | 10 | 13 | 16 | 19 | 22 | 25 | 28 | 31 |
|---|---|---|----|----|----|----|----|----|----|----|
| 34 | 37 | 40 | 43 | 46 | 49 | 52 | 55 | 58 | 61 | 64 |
| 67 | 70 | 73 | 76 | 79 | 82 | 85 | 88 | 91 | 94 | 97 |
| 100 | 103 | 105 | 109 | 112 | 115 | 118 | 121 | 124 | 127 | 130 |
| 133 | 136 | 139 | 142 | 145 | 148 | 151 | 154 | 157 | 160 | 163 |
| 166 | 169 | 172 | 175 | 178 | 181 | 184 | 187 | 190 | 193 | 196 |
| 199 | 202 | 205 | 208 | 211 | 214 | 217 | 220 | 223 | 226 | 229 |
| 232 | 235 | 238 | 241 | 244 | 247 | 250 | 253 | 256 | 259 | 262 |
| 265 | 268 | 271 | 274 | 277 | 280 | 283 | 286 | 289 | 292 | 295 |

Y

| 2 | 5 | 8 | 11 | 14 | 17 | 20 | 23 | 26 | 29 | 32 |
|---|---|---|----|----|----|----|----|----|----|----|
| 35 | 38 | 41 | 44 | 47 | 50 | 53 | 56 | 59 | 62 | 65 |
| 68 | 71 | 74 | 77 | 80 | 83 | 86 | 89 | 92 | 95 | 98 |
| 101 | 104 | 107 | 110 | 113 | 116 | 119 | 122 | 125 | 128 | 131 |
| 134 | 137 | 140 | 143 | 146 | 149 | 152 | 155 | 158 | 161 | 164 |
| 167 | 170 | 173 | 176 | 179 | 182 | 185 | 188 | 191 | 194 | 197 |
| 200 | 203 | 206 | 209 | 212 | 215 | 218 | 221 | 224 | 227 | 230 |
| 233 | 236 | 239 | 242 | 245 | 248 | 251 | 254 | 257 | 260 | 263 |
| 266 | 269 | 272 | 275 | 278 | 281 | 284 | 287 | 290 | 293 | 296 |

| 3 | 6 | 9 | 12 | 15 | 18 | 21 | 24 | 27 | 30 | 33 |
|---|---|---|----|----|----|----|----|----|----|----|
| 36 | 39 | 42 | 45 | 48 | 51 | 54 | 57 | 60 | 63 | 66 |
| 69 | 72 | 75 | 78 | 81 | 84 | 87 | 90 | 93 | 96 | 99 |
| 102 | 105 | 108 | 111 | 114 | 117 | 120 | 123 | 126 | 129 | 132 |
| 135 | 138 | 141 | 144 | 147 | 150 | 153 | 156 | 159 | 162 | 165 |
| 168 | 171 | 174 | 177 | 180 | 183 | 186 | 189 | 192 | 195 | 198 |
| 201 | 204 | 207 | 210 | 213 | 216 | 219 | 222 | 225 | 228 | 231 |
| 234 | 237 | 240 | 243 | 246 | 249 | 252 | 255 | 258 | 261 | 264 |
| 267 | 270 | 273 | 276 | 279 | 282 | 285 | 288 | 291 | 294 | 297 |

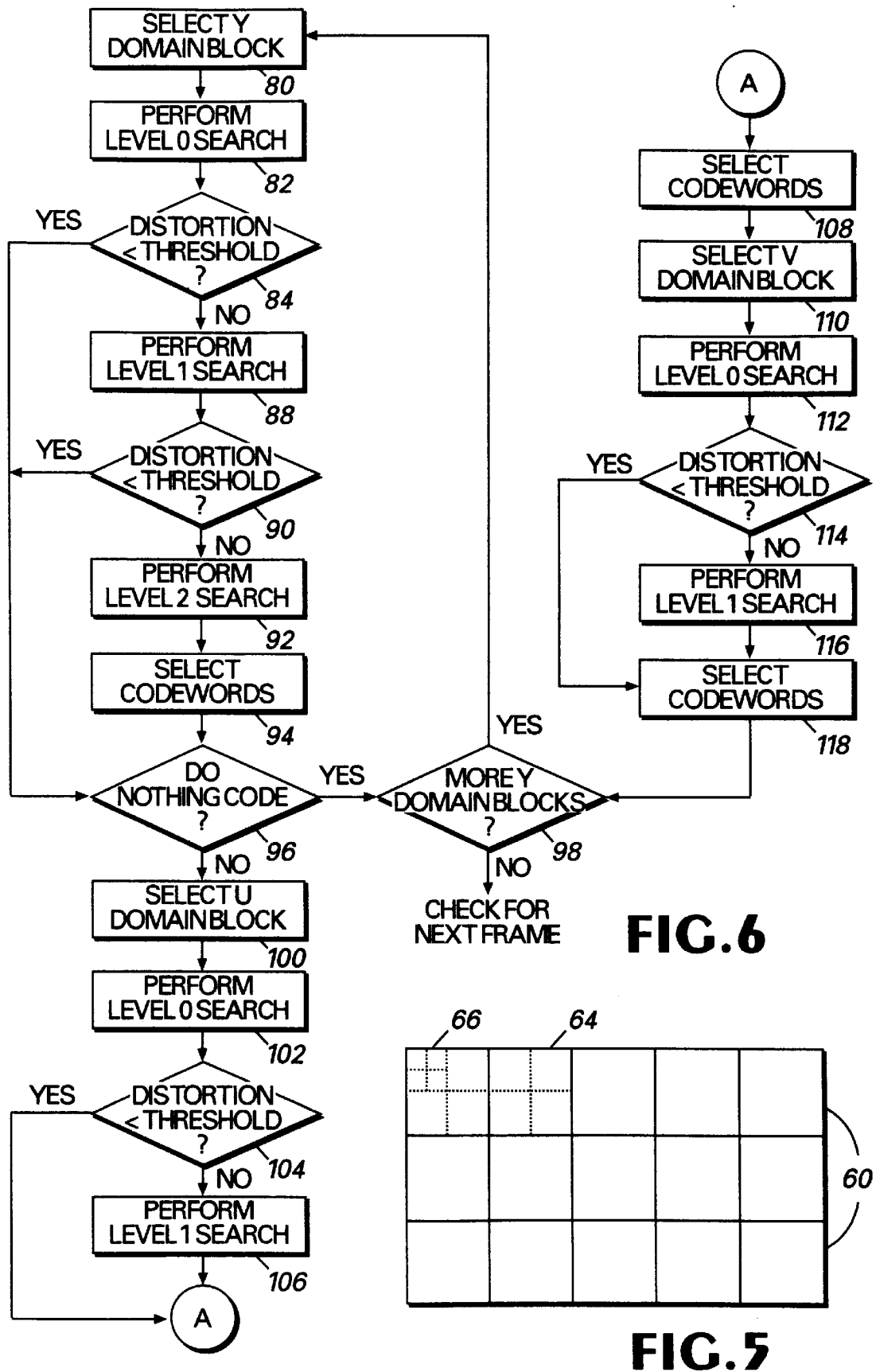

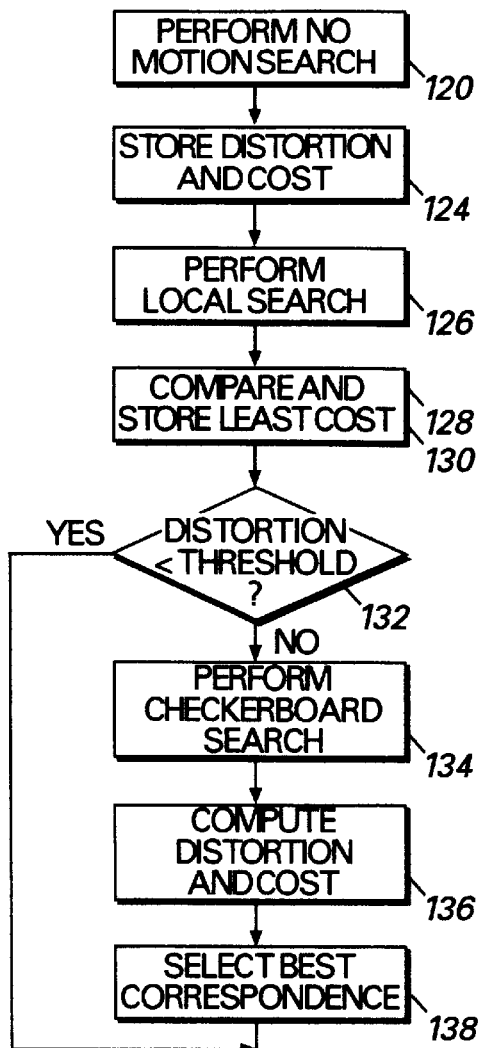
FIG. 7
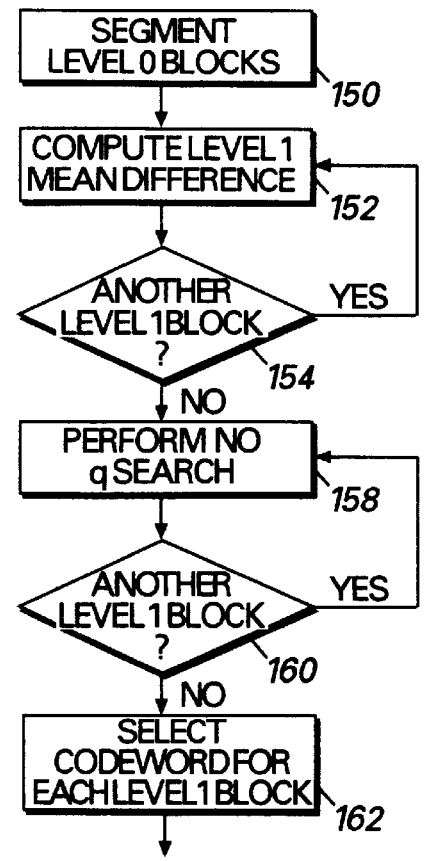
FIG. 9
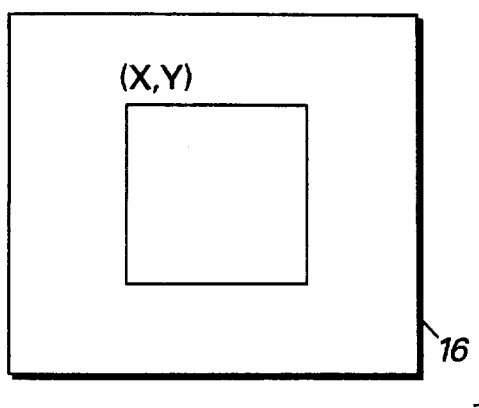
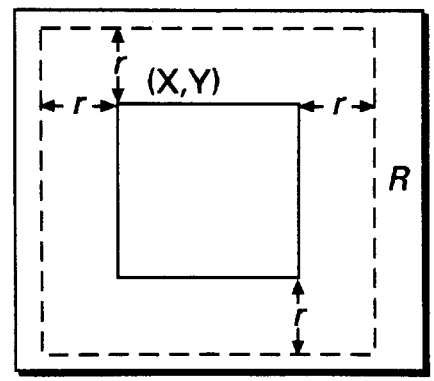
FIG. 8

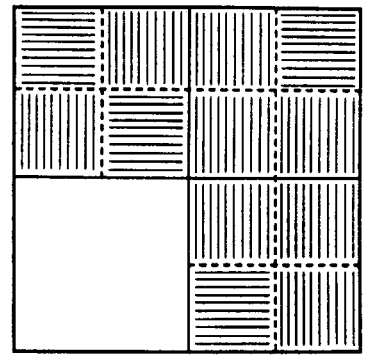

FIG. 12   FIG. 13

SORTED BY BLOCK:

CODEWORD FOR TOPMOST LEVEL, I.E. LEVEL 0      (SHAPE = 13)
    CODEWORD FOR CHILD 0 AT LEVEL 1      (SHAPE = 9)
        CODEWORD FOR CHILD 0 AT LEVEL 2      (SHAPE = 0)
        CODEWORD FOR CHILD 3 AT LEVEL 2      (SHAPE = 0)
    CODEWORD FOR CHILD 2 AT LEVEL 1      (SHAPE = 4)
        CODEWORD FOR CHILD 2 AT LEVEL 2      (SHAPE = 0)
    CODEWORD FOR CHILD 3 AT LEVEL 1      (SHAPE = 2)
        CODEWORD FOR CHILD 1 AT LEVEL 2      (SHAPE = 0)

FIG. 14A

SORTED BY LEVEL:

CODEWORD FOR TOPMOST LEVEL, I.E. LEVEL 0      (SHAPE = 13)
CODEWORD FOR CHILD 0 AT LEVEL 1      (SHAPE = 9)
CODEWORD FOR CHILD 2 AT LEVEL 1      (SHAPE = 4)
CODEWORD FOR CHILD 3 AT LEVEL 1      (SHAPE = 2)
CODEWORD FOR CHILD 0 AT LEVEL 2      (SHAPE = 0)
CODEWORD FOR CHILD 3 AT LEVEL 2      (SHAPE = 0)
CODEWORD FOR CHILD 2 AT LEVEL 2      (SHAPE = 0)
CODEWORD FOR CHILD 1 AT LEVEL 2      (SHAPE = 0)

FIG. 14B

| COLOR | LEVEL | TYPE | SHAPE | X | Y | Q |

| $P_{00}$ | $P_{01}$ | $P_{02}$ | $P_{03}$ |
|---|---|---|---|
| $P_{10}$ | $P_{11}$ | $P_{12}$ | $P_{13}$ |
| $P_{20}$ | $P_{21}$ | $P_{22}$ | $P_{23}$ |
| $P_{30}$ | $P_{31}$ | $P_{32}$ | $P_{33}$ |

DCT / IDCT

| $C_{00}$ | $C_{01}$ | $C_{02}$ | $C_{03}$ |
|---|---|---|---|
| $C_{10}$ | $C_{11}$ | $C_{12}$ | $C_{13}$ |
| $C_{20}$ | $C_{21}$ | $C_{22}$ | $C_{23}$ |
| $C_{30}$ | $C_{31}$ | $C_{32}$ | $C_{33}$ |

METHOD AND SYSTEM FOR THE FRACTAL COMPRESSION OF DATA USING AN INTEGRATED CIRCUIT FOR DISCRETE COSINE TRANSFORM COMPRESSION/ DECOMPRESSION

BACKGROUND FIELD OF THE INVENTION

This invention relates to data compression, and more particularly, to the compression of data using fractal methods.

BACKGROUND OF THE INVENTION

Data compression is an important aspect of data communication. As digital data proliferates, the size of the data sets being communicated are increasing. The communication conduits over which this data is transmitted have a limiting bandwidth which slows the time for the transmission of the entire data set to a remote site. Data compression methods have been developed which reduce the size of the data set prior to its transmission and permit the regeneration of the data set at the remote site which receives the compressed data set. When the regeneration of the data set results in no loss of data, the compression method is called lossless compression. When the regenerated data set represents the original data set but does not reproduce it exactly, the compression method is called lossy. Lossy compression methods are especially useful in image transmissions since the human eye is tolerant of some loss of image data.

Many lossy compression methods have been developed. Among these are discrete cosine transform ("DCT") methods, wavelet methods, and fractal methods. Even among these broad descriptions of lossy compression methods, there are variants for each method. In an effort to standardize a lossy compression method to encourage development of compatible products and processes, the Joint Photographic Experts Group ("JPEG") adopted a baseline DCT-based compression method as a standard for image data compression. For similar reasons, the Moving Pictures Expert Group ("MPEG") also developed a DCT-based standard for the compression of image data in frames of a video sequence. The adoption of the standard determines a number of operating parameters for the DCT compression of image data which may be implemented in image compressor/ decompressor products. Consequently, the products have some degree of uniformity so they are compatible with one another. Companies generally view development of DCT-based products and processes as being less risky because the standard creates a market of customers who desire the product compatibility provided by the standard.

Compression methods may be implemented by a general purpose computer executing instructions stored in memory to generate a compressed representation of a data set usually stored in a working memory. This implementation has the advantage of being flexible since the program operating the general purpose computer may be more easily modified than a program stored within a read-only memory ("ROM") or the like. While this type of system is more flexible, it suffers from speed limitations when compared to dedicated hardware systems such as those implemented in integrated circuits ("IC"). Integrated circuits may be developed for particular applications, including data compression/ decompression. These dedicated ICs usually include specialized processors and supporting components which are adapted to a particular application. By so designing an IC, the time required to process data for the specialized application is often greatly reduced.

The cost for designing and fabricating an IC may be quite expensive. Typically, thousands of hours are required to design the specialized circuitry for the IC and the cost for preparing a manufacturing line to build the package containing the IC involves substantial capital cost. Thus, the advantages to be gained from specialized circuitry implemented in an IC must be balanced against the cost of designing, fabricating and manufacturing the IC. Because the cost and time for bringing an IC to market is significant, IC manufacturers tend to be risk averse. Consequently, the development of specialized ICs which implement lossy data compression methods have tended to implement DCT-based methods, almost to the exclusion of other methods.

While DCT-based methods have gained an advantage in speed of method implementation through specialized ICs, the advantage has not been so great as to preclude further development of the fractal and wavelet methods. Because the DCT method is restricted to certain block sizes and constraints on cosine coefficients, the method has problems with resolution independent applications, blocking artifacts, and relatively low compression rates. One improved fractal encoding method for video sequences is disclosed in a co-pending patent application entitled System and Method For Representing A Video Sequence having Ser. No. 08/586, 341 which is co-owned by the assignee of the present application. That method uses a variable block size approach coupled with a mean corrected comparison scheme and codeword bit cost evaluation to compress image data sets more efficiently than DCT-based methods and remain within the bandwidth of a communication conduit for the transmission of video frames. That method is preferably implemented on a single general processor with a standard bus and interface connections to memory and input/output ("I/O") devices. While the system and method of that application are effective for off-line compression of high frame rates and real time applications for lower frame rates, there is a need for implementing that improved method for video sequences in real time at higher frame rates. However, the cost and time for development of a dedicated processor to implement that method for such an application appears to be cost prohibitive at this time. What is needed is a system and method which utilizes the speed of a DCT processor to implement a fractal encoding method.

Additionally, the method and system discussed in the above referenced application can be computationally intense because the domain blocks at each size level are exhaustively searched through a range area to find a range block which best corresponds to a domain block. Conducting exhaustive searches at each level may require such a number of computations that the codewords are not generated quickly enough to support the rate of frame generation necessary for timely transmission of the compressed frames of a video sequence. What is needed is a fractal encoding method and system which further reduces the searches required to find block correspondences for compressing a data set.

SUMMARY OF THE INVENTION

The above-limitations of previously known fractal methods and DCT processors are overcome by a system and method prepared in accordance with the principles of the present invention. That method includes the steps of determining a best block correspondence between a domain block of a frame buffer and one of a block in a previous frame buffer and a vector quantization block and determining a set of affine map codes which correspond to the determined best block correspondence. This method may be implemented in a system of the present invention which uses a DCT processor to determine the best block correspondence.

The preferred application of the present invention is for compressing frames of a video sequence, although the system and method may be used to lossy compress any set of related data sets. For video frames, the system preferably uses a DCT processor which scales and filters a SIF image to a QCIF size of 176×144 pixels. Preferably, the image to be compressed is a chrominance/luminance space ("YUV") image. The Y component is preferably 176×144 pixels and the U and V components are preferably 88×72 pixels. This sizing of the Y, U, and V components comports with well known techniques which reduce the size, and correspondingly, the processing time, of the U and V components. This reduction in size does not significantly degrade image quality since most of the detail discernible to the human eye is contained in the Y component.

The method segments the Y component into domain blocks of a first size and the U and V components into domain blocks which are preferably one quarter of the Y component domain block size. Preferably, a domain block of the Y component is processed first, followed by the processing of the corresponding domain blocks in the U and V components. The processing of a domain block in the Y component begins with a determination of the difference between the domain block and the corresponding block in the previous frame. The processing continues by performing a local search. The local search compares the domain block to a plurality of range blocks in a range area of the previous frame buffer and selects a domain block/range block combination corresponding to the smallest distortion measurement between the domain and range blocks. This domain block/range block combination may be represented by a set of affine map codes which, preferably, include a shape, motion vector and q parameter. These affine map codes may be in turn be losslessly compressed using an entropy encoder. The cost of the affine map codes, as used in this application, is the sum of the distortion measurement for a best correspondence multiplied by a normalization factor and the length in bits of the codeword generated by the entropy encoder multiplied by bit rate factor. This cost may be used to evaluate whether the distortion measurement obtained by including the affine map codes represented by the codeword are worth the bit cost of the codewords in the output stream. The process continues by comparing the smallest distortion measurement for the best correspondence to a threshold to determine whether further searching is to be performed.

If the threshold is exceeded, the process defines a larger range area in the previous frame buffer and performs a checkerboard search of the range blocks in this larger area. Preferably, the origins of these range blocks are located on every other row and column of the range area. Because the range area is larger than a working area for a data comparator in the preferred embodiment, the range area is searched in three passes which process one third of the range area at a time. The cost of representing the domain block in terms of the range block having the smallest distortion measurement of one pass is compared to the cost for representing the domain block in terms of the range block of another pass. The representation having the least cost is selected as the best checkerboard representation. A cost for representing the domain block with a do nothing code is computed and the cost of the no motion, local search and best checkerboard affine map codes are compared and the one corresponding to the least cost is the best correspondence for the domain block.

If the best correspondence is the do nothing code, domain block processing is terminated and the corresponding domain blocks in the U and V components are not processed. Otherwise, the distortion measurement for the best correspondence for the domain block is compared to the threshold value and if the threshold is exceeded, processing of segments of the domain block is performed. The threshold is related to a distortion value which the human eye can detect. If this threshold is exceeded, additional searching is performed for the current domain block in the Y component.

Additional searching is performed by segmenting the domain block of the Y component into a plurality of domain child blocks. For each child block, a mean pixel difference value between the a domain child block and a corresponding range block is computed and stored. A corresponding range child area for each domain child block is then selected. One of the domain child blocks is selected and compared to each range child block within the range child area to determine a distortion measurement for each domain child block/range child block combination. The motion vector corresponding to the domain child block/range child block combination having the lowest distortion measurement is stored. The cost for the domain child block mean pixel difference codeword and the domain child block motion vector codeword are compared and the least cost is used to determined the best correspondence for the domain child block. The distortion measurement corresponding to the selected codeword is compared to the threshold and, if the threshold is exceeded, the child domain blocks are segmented for further searching. The threshold value for the domain child blocks correspond to the threshold value for the domain blocks adjusted for the smaller size of the domain child blocks.

The determination of the best correspondence for the domain block in the Y component being processed continues by segmenting each selected domain child block into a plurality of domain child sub-blocks. Each domain child sub-block of a selected domain child block is compared to the vector quantization (VQ) blocks stored in a VQ table and a distortion measurement for each comparison is computed. The domain child sub-block/VQ block comparison which yields the smallest distortion measurement is selected as best representing the domain child sub-block. The VQ block has a corresponding vector identifier and mean value or q parameter. Once a vector identifier and a q parameter have been selected for each domain child sub-block, the cost of the codeword which represents the vector identifier and q parameter is computed. If the cost for the codeword for a domain child sub-block is less than the distortion measurement for the portion of the domain child block which corresponds to the domain child sub-block, the codeword for the domain child sub-block is added to the set of affine map codes for the domain block. If all of the codewords for the domain child sub-blocks are selected, then the codeword for the domain child block is removed from the set of affine map codes which represent the domain block. The cost of the codewords for the selected domain child sub-blocks and the domain child blocks are then compared to the distortion measurement for the domain portion of the block which corresponds to the domain child block. If the cost is less than the distortion measurement, the codewords for the domain child blocks and domain child sub-blocks are retained to represent the domain block. The cost of the retained map codes and the domain block map codes are compared to the cost of a do nothing code. The map codes corresponding to the least cost are selected to repeat the domain block. The set of affine map codes selected by this series of comparisons is then preferably encoded using an entropy encoder and transmitted as a compressed representation of the domain block of the Y component.

The corresponding domain block of one of the U and V components is then processed. The motion vector determined for the best correspondence between the domain block and a range block is adjusted for the smaller size of the U and V components. Preferably, the motion vector for the domain block of the Y component is shifted right by 1. The corresponding domain block in the U or V component is then compared to the range block corresponding to the adjusted motion vector for the corresponding color component in the previous frame and a distortion measurement is computed. If this distortion measurement is less than a predetermined threshold, no further searching is performed. If the distortion measurement exceeds the predetermined threshold, the domain block of the U or V component being processed is segmented into a plurality of domain child blocks. Each domain child block is then compared to a table of VQ blocks for the corresponding color component and the VQ block yielding the lowest distortion measurement is selected. The cost of the codeword representing the VQ block identifier and q parameter for each domain child block is computed and compared to the distortion measurement for the portion of the domain block which corresponds to the domain child block. If the cost for the domain child block is less than the distortion measurement for the portion of the domain block which corresponds to the domain child block, the map codes for the domain child block are included in the set of affine map codes for the domain block. The affine map codes for the processed domain block are then entropy encoded for transmission to the remote site. Since the U and V components are one quarter the size of the Y component, the domain child block for the U and V components are the same size as the domain child sub-block for the Y component and consequently, searching for a best correspondence is terminated at this level.

Processing for the next domain block in the Y component, followed by processing of the U and V components, continues until all of the domain blocks in the Y, U and V components are processed. At this point, all of the codewords necessary to represent the frame have been generated, encoded and transmitted to a remote site. To generate the previous frame to be used to compress the next frame, a decompressor at the compressor site is used to decompress the set of affine map codes so the compressor is using the same the same data set to compress the next frame that the decompressor at the receiver site is using to decompress compressed frames. The process may then continue by loading a new frame of video data for processing or, if no frame is detected, terminating the process.

In a preferred embodiment of the present invention, the cost for a codeword is the sum of a normalized distortion measurement and the length of the codeword being evaluated adjusted by a factor which corresponds to the total bit length of the codewords previously generated for the frame. Most preferably, the normalization divisor is a power of 2 so that multiplication of the distortion measurement may be achieved by shifting the distortion measurement to the left. The total number of bits which may be used to represent the affine map codes for a frame has a predetermined upper limit which corresponds to the maximum number of bits which may be transmitted and remain within the transmission rate of the communication conduit. If the number of bits used for the codeword increases at a rate which would exceed this upper bound prior to all of the domain blocks for a frame being processed, then the bit rate multiplier is increased so that smaller code words are generated for the affine map codes representing later domain blocks. If the number of bits for codewords being generated for domain blocks lag behind a predetermined rate for codeword generation, then the bit rate multiplier may be decreased to take advantage of the excess capacity for codeword size to increase the detail contained in the compressed image.

At the receiver site, codewords which represent the affine map codes are decoded. The decoded map codes identify blocks within a regenerated frame buffer are the motion vectors, q values or both which are to be applied to the pixels of the identified blocks. The motion vectors are used to move pixels of the identified blocks in the regenerated frame into a current frame buffer. The q parameter is used to adjust pixel values for the domain child blocks of the Y component having no motion vector or the VQ blocks corresponding to VQ identifiers. The adjusted pixels for these blocks are then moved to the current frame. In this manner, codewords from the compressor are used to move blocks from the regenerated frame buffer and the VQ tables to a current frame buffer to regenerate an approximation of the original frame. The regenerated frame in the current frame buffer is then used to update the regenerated frame buffer. The regenerated frame is also converted for video output at the decompressor.

A further enhancement of the present invention is the operation of the processing system in a half-frame mode. This mode begins by interpolating a 176×128 pixel image to a 176×64 pixel image. Preferably, this size image is generated by removing the bottom sixteen lines of a QCIF image to generate the 176×128 pixel image. A vertical 7-tap filter implemented in microcode and stored in the DCT processor is used to generate the 176×64 pixel image. Alternatively, a similarly implemented 5-tap filter may be used or adjacent column pixels of the Y component of the interpolated QCIF image may be pixel averaged to generate the 176×64 pixel image. The corresponding U and V components for the 176×64 pixel Y component are preferably determined by pixel averaging adjacent pixel elements in a column. Compression of the interpolated image continues using the same domain block, domain child block, and domain child sub-block sizes as described above with respect to the larger pixel images. By using the same size domain blocks and segments to process the smaller frame, the frames are more quickly compressed. At the decompressor, the image is decompressed into a 176×64 pixel Y component and 88×32 pixel U and V components. These components are then vertically scaled by a factor of 2 using line doubling, a filter process available in the DCT processor or some other known scaling method. While some image quality is sacrificed as a result of the interpolation and filtering necessary to preprocess the image size, the speed in compressing and decompressing the image is substantially improved.

A system made in accordance with the principles of the present invention includes a host processor, a DCT processor, program/data memory and frame buffer memory. The DCT processor preferably includes components for scaling and filtering video frame data prior to storage of the frame data in a current frame buffer of the frame buffer memory. Preferably, the DCT processor includes a process controller and a data comparator. Preferably, the data comparator is single instruction, multiple data (SIMD) processor. In the most preferred embodiment, the DCT processor is a video codec processor in which the process controller is a reduced instruction set controller (RISC) and the data comparator is a vision processor (VP). The DCT processor of the most preferred embodiment also includes a direct memory access (DMA) controller. The program/data memory stores the program and operating data for the RISC processor which performs the overall control of the process and the frame buffer memory contains the current frame buffer, previous frame buffer and VQ tables discussed above. While the internal program memory of the data comparator is provided by the manufacturer with microcode to implement predetermined data functions, the program memory can also be loaded with microcode to implement the block comparison and mean calculation operations discussed above. Preferably, the process controller supplies addresses of blocks in the current frame to the DMA controller which transfers domain blocks from the current frame buffer to an internal memory of the data comparator. The process controller then supplies previous buffer addresses or VQ table addresses for loading blocks from either buffer to another segment of internal memory for the data comparator. The process controller then instructs the data comparator to perform a multiple data operation on the data blocks in the internal memory. After executing an instruction, the data comparator may return a mean pixel difference, a distortion value, a motion vector, a vector identifier or a combination thereof to the process controller. The process controller uses the data returned by the data comparator to construct the affine map codes that represent a domain block or portion thereof. The process controller entropy encodes the affine map codes to generate a codeword and determines the cost for including the codeword in a representation of the frame data. Using the computed costs and distortion measurements, the process controller selects the codewords for representing a domain block and provides the codewords to the host processor for transmission to a remote site.

While the preferred embodiment of the present invention includes the use of a DCT processor, the method of the present invention may be utilized on a general purpose processor and still achieve better image fidelity and higher frame rates than methods previously known. Advantages gained by the present method and system are thought to arise from the variable block size used in the various comparisons to determine the affine map codes, the thresholds used to determine whether a domain block or component thereof needs further segmentation, and a costing scheme which simplifies computation of a cost yet provides an accurate indication of the value of adding another codeword to the set of affine map codes representing a domain block.

These and other advantages and benefits of the present invention may be ascertained from the detailed description of the invention in the accompanying drawings.

DETAILED DESCRIPTION OF DRAWINGS

FIG. 4 is an example of the order in which the blocks of the Y, U, V screen components are processed in the preferred embodiment of the invention;

FIG. 5 is an example of segmentation of the current frame buffer or previous frame buffer into domain blocks, domain child blocks and domain child sub-blocks;

FIG. 6 is a flowchart of the preferred method of compressing data at a high level;

FIG. 7 is a flowchart of the preferred process for performing the level 0 search for the Y components shown in FIG. 6;

FIG. 8 is a diagram of a range area for a search;

FIG. 9 is a flowchart of the preferred process for performing the level 1 search for the Y component shown in FIG. 6;

FIG. 12 is a depiction of a representation scheme for identifying blocks of a lower level having their affine map codes included to represent a domain block;

Figures 15, 16, 17:
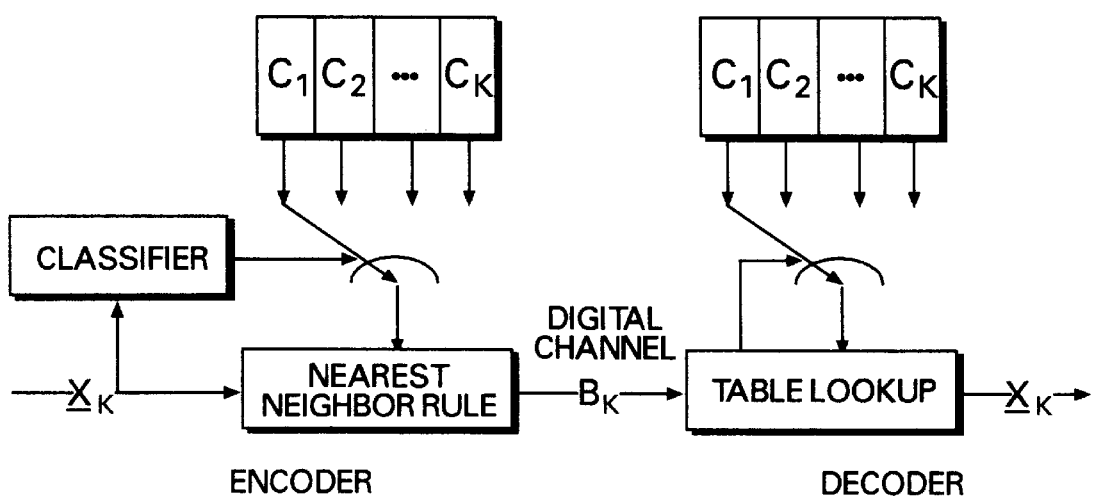

FIG. 13 is an example of level 1 and level 2 blocks used to represent a level 0 block;

FIG. 14A and B are examples of affine map code structure;

FIG. 15 is a block diagram of a codeword representing an affine map code;

FIG. 16 is a depiction of a DCT transformation of a pixel block;

FIG. 17 is a block diagram of a classified vector quantization device; and

Figure 18:
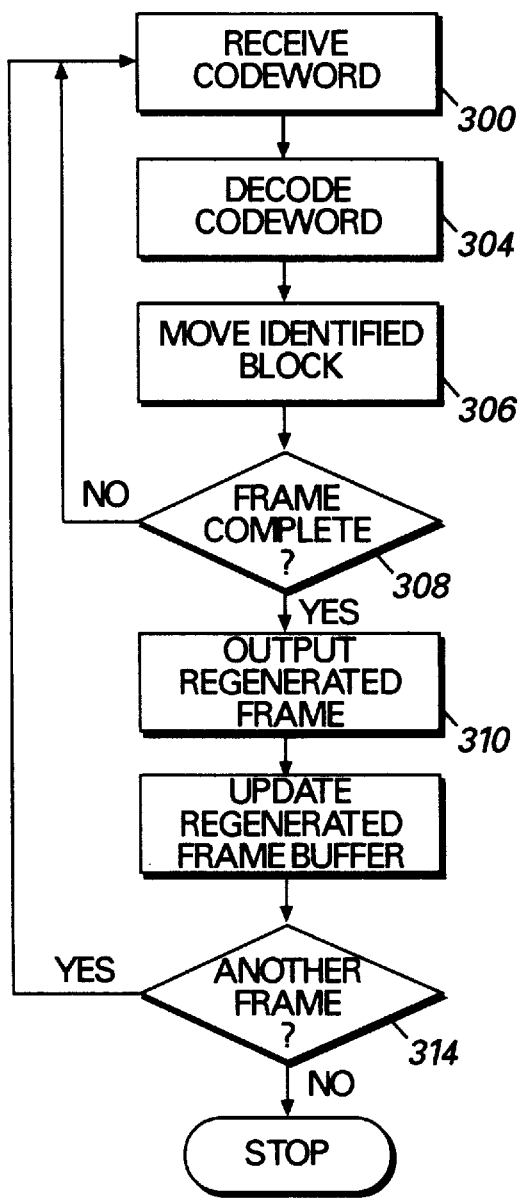

FIG. 18 is a flowchart of a decompression process used in the decompression of the present invention;

DETAILED DESCRIPTION OF INVENTION

Figure 1:
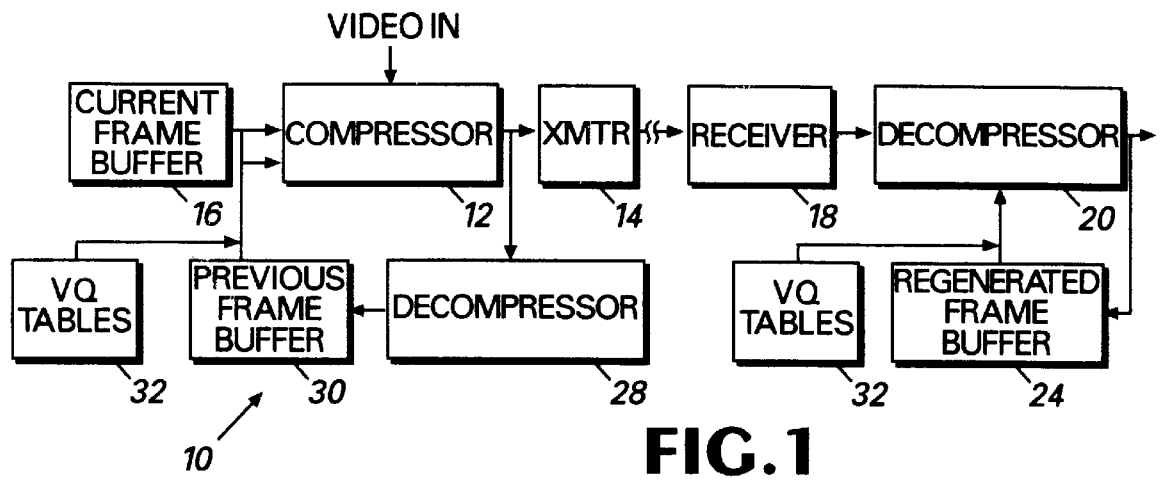
FIG. 1 is a block diagram of a system which incorporates the principles of the present invention.

A system which may be used to implement the method of the present invention is shown in FIG. 1. The system 10 includes a compressor 12 which generates sets of affine map codes which compress a current frame of video data contained within current frame buffer 16 or a portion thereof using data contained in previous frame buffer 30 and vector quantization memory 32. Digitized video signals from a video sequence generator, such as a camera or the like (not shown), may be provided to compressor 12 and stored in current frame buffer 16. The sets of affine map codes generated by compressor 12 are entropy encoded and output to a transmitter 14 which transmits the codewords representing a current frame to a receiver 18. Receiver 18 provides the codewords to a decompressor 20 which decodes them into affine map codes which are used to identify, adjust and move data from regenerated frame buffer 24 or vector quantization memory 32 to generate a current frame for display and to replace the contents of frame buffer 24. The codewords output by compressor 12 are also provided to a decompressor 28 which generates a representation of the current frame using the process implemented by decompressor 20. The video frame generated by decompressor 28 is stored in previous frame buffer 30. The contents of previous frame buffer 30 are used by compressor 12 to generate codewords which represent the content of current frame buffer 16.

Preferably, current frame buffer 16, previous frame buffer 30 and regenerated frame buffer 24 all contain sufficient memory elements to store pixel data elements for a multiple screen component video frame. Most preferably, the frame buffers 16, 30, and 24 are sized to store a 176×144 pixel Y component and a U and V component that are 88×72 pixels each for a video frame having a width of 176 pixels and a height of 144 pixels. Preferably, each pixel data element is one byte in length to define 256 levels for each of the screen components. Preferably, the intensity levels for each pixel are expressed in signed integer form so that the range for the pixels are −128 to +127. As a result, a gray pixel value is a zero (0) value pixel. As explained above, the U and V components of the YUV color space may be as small as one-quarter of the Y component array, although other ratios may be supported in the system and method of the present invention. Thus, use of the YUV color space reduces some of the computational requirements for generating the affine map codes which best represent a current frame of video data. Although the system and method of the present invention are described in detail for the compression and decompression of frames in a video sequence, the inventive system and method may also be used to lossy compress any sequence of related data sets.

Figure 2:
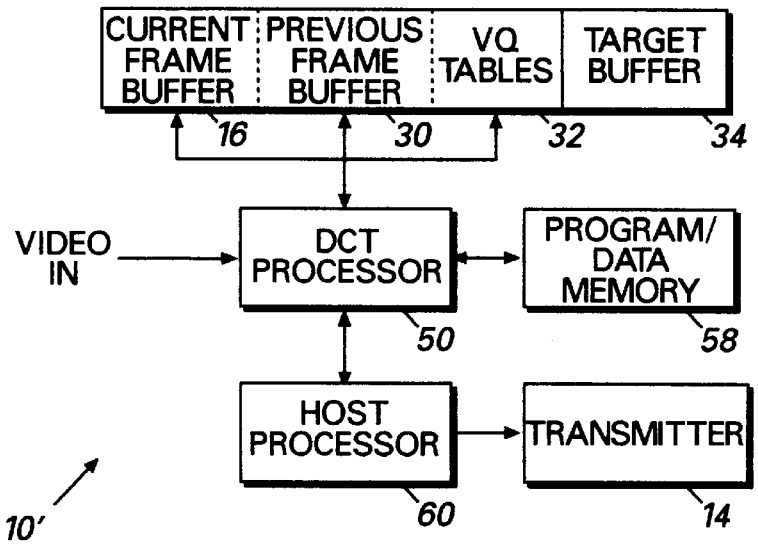
FIG. 2 is a block diagram of a preferred embodiment of the compressor shown in FIG. 1.

A preferred implementation of a compression system 10' is shown in FIG. 2. The system includes a DCT processor 50 which receives digitized video data and stores the data in current frame buffer 16. Previous frame buffer 30 contains the decompressed representation of the frame received prior to the current frame stored in buffer 16. Tables of VQ blocks, which are discussed in more detail below, are stored in memory 32 which is also coupled to DCT processor 50. A program and the data necessary to operate DCT processor 50 are contained in program/data memory 58. The codewords generated during the compression of the current frame are provided to a host processor 60 which provides the compressed codewords to transmitter 14. After the affine map codes are generated for a domain block, they are used to move data from the previous frame buffer or VQ tables, along with any required pixel adjustment indicated by the map codes, to target buffer 34. Thus, target buffer 34 contains the decompressed image. After a frame has been processed, the pointers to the previous frame buffer and target buffer are switched so the target buffer becomes the previous frame buffer and vice versa. This eliminates the need to transfer a decompressed frame from the target buffer to the previous frame buffer following compression of the current frame. Alternatively, the decompressed blocks may be stored in the current buffer since the domain blocks in the current buffer are preferably processed in a leftmost pixel to rightmost pixel, top row to bottom row order. Thus, writing over a processed domain block does not overwrite pixel elements later used in the compression process.

In the preferred embodiment of the present invention, the DCT processor 50 is a single chip video codec processor which is preferably manufactured by Integrated Information Technology, Inc. of Santa Clara, Calif., and designated by the part number IIT 3104 VCP. This particular DCT processor includes a reduced instruction set controller ("RISC") and a vision processor ("VP"). The program which may be used to operate the RISC processor is contained in program/data memory 58. The VP is controlled by a micro-code program stored in a ROM memory internal to the DCT processor 50. The manufacturer of the VCP provides a standard set of instructions which are performed by microcode. In the preferred embodiment of the present invention, the functions performed by the VP are instead implemented by micro-code which is downloaded and stored, prior to using the compressor, in a static RAM area which is internal to the DCT processor. The VCP processor also includes static RAM, ROM and register sets for the RISC processor along with the necessary interfaces for communicating with a telephone port, serial audio port, video input, and video output. The VP is a SIMD processor. Host processor 60 may be a personal computer ("PC"), microprocessor, or microcontroller. The host processor is used to communicate codewords to the transmitter and to provide the codewords to the DCT processor for a decompression cycle to regenerate the representation of the current frame. Preferably, current frame buffer 16, previous frame buffer 30, VQ memory 32, and target buffer 34 are implemented in DRAM, although other volatile storage elements may be used. The program/data memory 58 is preferably SRAM memory.

Figure 3:
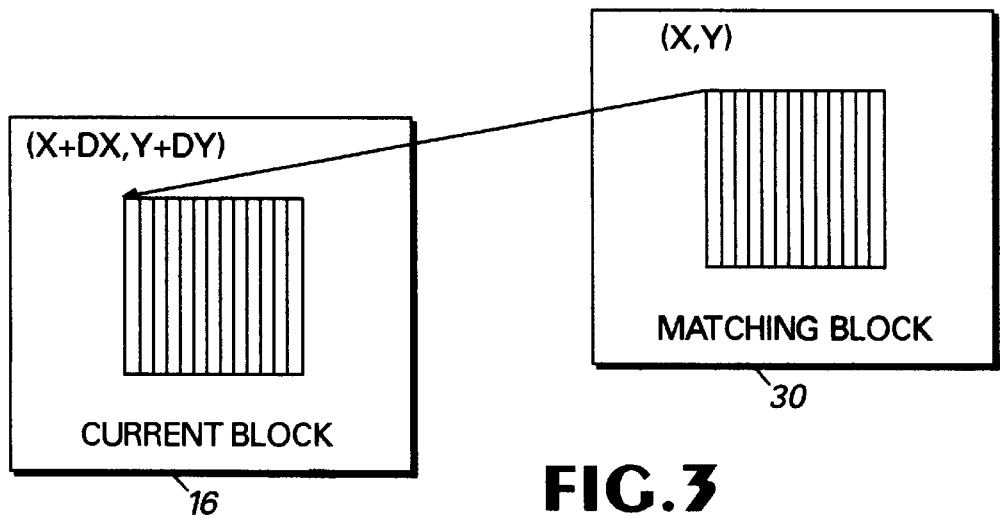
FIG. 3 is an example of a motion vector which correlates a previous frame block to a current frame block.

Preferably, system 10' generates codewords which represent the data in current frame 16 in terms of data in previous frame buffer 30. This is preferably done by segmenting the screen components for the data in each frame buffer into blocks and determining a best match between corresponding blocks in the current frame buffer and previous frame buffer. The location of the blocks which best correspond to one another may be used to determine a motion vector. For example, FIG. 3 shows that a block in the Y component stored in current frame buffer 16 may be generated by moving a block of the Y component stored in previous frame buffer 30. The block in the current frame buffer 16 has its upper leftmost pixel data element located at (x, y). The location of the corresponding block in the Y component stored in the previous frame buffer 16 may be expressed as (x+dx, y+dy) where dx and dy describe a difference in the x and y indices which identify the upper, leftmost pixel data element for the block of the Y component of the previous frame buffer. Thus, (dx, dy) may be used to determine a spatial motion vector relative to the origin of the block which describes the movement of a block of pixels in previous frame buffer 30 to generate a block of pixels that represent a block of pixels in current frame buffer 16. A decompressor may then apply this motion vector to a corresponding block in a previous frame buffer to generate a block of video data which corresponds to a block of data in a current frame.

To find a block in previous frame buffer 30 which corresponds to a block in current frame buffer 16, a search must be performed. Preferably, the search is performed by segmenting the data in current frame buffer 16 into domain blocks having a first size. In the preferred embodiment, the codewords which best represent the first domain block of the Y component are determined, followed by the first domain blocks of the U and V components. A graphic representation of this processing order is shown in FIG. 4. While this ordering scheme is preferred others may be used without departing from the principles of the present invention. For example, the order of the U and V components may be reversed.

Preferably, the method of the present invention performs level searches on the domain blocks for each component of a video frame. These levels correspond to different sizes of blocks in the current frame buffer which are compared to blocks either in the previous frame buffer or in the VQ tables. These levels are shown, for example, in FIG. 5. There, level 0 is comprised of domain blocks 60. These level 0 domain blocks may be further subdivided into level 1 domain child blocks 64 which are each preferably one quarter of the domain block from which they were segmented. Each domain child block 64 may be further segmented into level 2 domain child sub-blocks 66. In the depiction shown in FIG. 5, the blocks 60, 64 and 66 represent levels 0, 1, and 2, respectively for the Y component. Preferably these blocks are 16×16, 8×8 and 4×4, respectively, in size. Because the U and V components are one quarter the size of the Y component, level 0 and level 1 blocks are comprised of domain blocks of the 8×8 pixel size and domain child blocks are of the 4×4 pixel size. These levels and their corresponding block sizes are exemplary only and are not a limitation of the present invention.

The high level process for compressing the data in the current frame buffer 16 is shown in FIG. 6. A process begins by selecting a Y domain block (block 80) and performing a level 0 search for the best corresponding block at level 0 (block 82). The level 0 search returns an error or distortion measurement which is compared to a threshold (block 84) and if the error is less than the threshold, the process checks to see if the U and V components are to be compressed individually 96. Otherwise, a level 1 search for the Y component domain block is performed (block 88) and the distortion measurement for the level 1 search is compared to the threshold (block 90). If the error is greater than the threshold, a level two search is performed (block 92). The cost for each codeword which may be used to represent a block at level 2 is computed and compared to the distortion measurement of the portion of the next highest level block which corresponds to the level 2 block. If the cost of the codeword for a block at a lower level is less than the distortion measurement for the affine map codes of the upper level corresponding portion of the block, the codeword for the lower level block is included in the set of affine map codes used to represent the domain block (block 94). When all of the codewords have been selected for domain block, the process determines whether a do-nothing code may be used to represent the Y domain block (block 96). A do-nothing code occurs when the domain block is sufficiently similar to the corresponding block in the previous frame buffer. If the do-nothing code can be used to represent the Y component domain block in the current frame buffer, the corresponding domain blocks in the U and V components are, preferably, not processed. Alternatively, the evaluation to determine whether a do nothing code is used to represent the domain block may occur after the Y, U and V domain blocks have been processed. If there are any remaining domain blocks in the Y component (block 98), the process continues. Otherwise, the process looks for a next frame.

If a do nothing code was not generated, the domain block in the U component which corresponds to the domain block in the Y component just processed is selected (block 100), and level 0 search is performed (block 102). If the distortion measurement for level 0 exceeds the threshold (block 104), a level 1 search is performed (block 106). The cost for each codeword for the level 1 blocks are compared to the distortion measurement for level 0 and the map codes for the level 1 blocks which are less than the distortion measurement are included in the affine map codes which represent the domain block of the U component (block 108). The corresponding domain block in the V component is then likewise processed (blocks 110, 112, 114, 116, and 118). The process then continues by determining whether another domain block in the Y component needs processing (block 98). The process continues until all of the domain blocks in the frame buffer have been processed.

The level 0 search process is shown in more detail in FIG. 7. The process begins with a no-motion search (block 120) and the distortion measurement and cost for the codeword representing a no-motion block is computed and stored (block 124). A local search is then performed (block 126) and the distortion measurement and codeword cost corresponding to the best correspondence which is determined by the smallest distortion measured during the local search is computed. The cost of the no motion search and local search are compared (block 128) and the affine map codes for the best correspondence having the least cost is stored (block 130). The distortion measurement for the search corresponding to the least cost is compared to a predetermined threshold (block 132) and if it is less than the threshold, the process continues at block 84 (FIG. 6). Otherwise, a checkerboard search is performed (block 134) and the smallest distortion measure and corresponding codeword cost for the best correspondence is computed (block 136). The cost of the best correspondence found in the checkerboard search is compared to the cost for the best correspondence found between the no motion and local search and the best correspondence having the least cost is selected (block 138). The affine map codes corresponding to this least cost establishes the codes which represent the level 0 block.

In more detail, a no-motion search is performed by specifying the location of the upper-most, left-most pixel of the domain block in the current frame buffer 16. The data values for the pixel elements comprising the level 0 domain block at that location are then compared to the data value of the same pixel locations in the previous frame buffer 30. The block of pixel elements in the previous frame buffer 30 comprise a range block. Preferably, the pixel by pixel comparison is a subtraction operation and the sum of the absolute differences of the pixel elements between the domain and the range block constitute the distortion measurement. This preferred distortion measurement is known as a sum of absolute differences or L1 distance, although other measurements such as L2 or the like may be used. The cost of a codeword for representing the no motion vector is computed and stored. As discussed in more detail below, this codeword represents the affine map codes for a shape and no motion vector. This value differs from a do nothing code which is a one bit code that indicates no affine map codes follow for any of the color components of the domain block.

A local search is performed by comparing the selected level 0 domain block to a plurality of range blocks in the previous frame buffer. FIG. 8 shows how this comparison is performed for a block within the interior of the frame. The search begins by locating the pixel in previous frame buffer 30 which corresponds to the upper, leftmost pixel of a selected domain block in current frame buffer 16. Using a radius parameter, a range area R is identified in previous frame buffer 30. Corresponding blocks are then formed from the pixels within this range area and compared to the pixel values in the domain block. Preferably, this comparison is performed by selecting the pixels corresponding to the domain block size and shape which have as their upper, leftmost pixel the upper, leftmost pixel of the range area. The next block to be compared is identified by adding 1 to all of the x indices of these pixels. This continues until the corresponding domain block in the range area has its rightmost boundary aligned with the rightmost boundary of the range area. The next block to be searched is found by decrementing the y coordinate for all of the pixels in the corresponding domain block and resetting the x coordinate value to the leftmost boundary. Blocks in this new line are formed by increasing the x coordinate one pixel at a time until the rightmost boundary of the corresponding domain block is aligned with the rightmost boundary of the range area. This moving of the corresponding block within the range area in a left to right manner continues until all of the possible domain size blocks within the range area are compared to the domain block in the current frame buffer 16.

In the preferred local search process, the radius about the domain block which defines the range area is seven pixels in length. If the domain block has a side which is at the edge of the current frame buffer, the corresponding range area in the previous frame buffer stops at the edge of the previous frame buffer. As a result, the number of range blocks in the range area is decreased and the search time for the local search is correspondingly decreased.

In more detail, the checkerboard search (block 134, FIG. 7) is preferably performed by increasing the range area but the range blocks compared to the domain block are formed differently than the range blocks used for the local search. In a checkerboard search, the range blocks are selected by beginning with the upper-most, left-most pixel in the range area and selecting the pixels which correspond to the same size as the domain block, as was done in the local search. Thereafter, the x coordinate is increased by 2 and the next block of pixels corresponding to the domain block are selected for comparison to the domain block in the current frame buffer. This process continues with the incrementing of the x coordinate by 2 until the right-most edge of the corresponding range block is coincident with the right-most edge of the range area. The next range block is then selected by decreasing the y component by 2 and resetting the x coordinate to the left-most edge of the range area. The x coordinate is increased by 2 to form range blocks until the rightmost edge of a range block is coincident with the rightmost edge of the range area. As a result, the range area is expanded for the checkerboard search but the search is not exhausted for every possible range block which may be included in this expanded area. This search is performed to see if better matches exist further away from the corresponding domain block without requiring the process to search every possible range block in the expanded range area.

To further decrease the number of data elements to be processed in the checkerboard search, the distortion measurement is only computed between every other row of the domain and range blocks. That is, only those pixel elements on alternating rows beginning with the top-most row of the range block are subtracted from the corresponding pixel elements in the corresponding rows of the domain block in the current frame buffer. This provides a rough approximation of one half of the distortion measurement normally obtained in the comparison between a domain block and a range block. The smallest distortion measurement for a domain block/range block comparison is selected as the best correspondence for the domain block. The motion vector which corresponds to this best is used to select a codeword which may represent the domain block.

In the preferred embodiment of the system implementing the method of the present invention, the origin of a level 0 domain block is provided through a direct memory access controller of the VCP which loads an internal memory associated with the VP of the DCT processor 50 with the pixel elements of the domain block. To perform a no-motion search, the RISC processor provides the origin of the corresponding range block to the DMA controller which transfers the corresponding range block from the previous buffer to an internal memory associated with the VP. The RISC processor then provides an instruction to the VP causing it to execute the corresponding micro-code in the static RAM for a no-motion distortion measurement. In response to this micro-code, the VP subtracts the pixel elements of the range block from the domain block and sums to absolute value of the differences to provide a distortion measurement which is returned to the RISC processor.

To perform the local search in the preferred embodiment, the RISC processor computes the left-most, upper-most pixel coordinates for the origin of the range area and provides that origin to the DMA controller. The DMA controller transfers the range area to the memory associated with the VP. The RISC processor then provides the VP with the instructions for comparing the domain block to the range blocks in the local range area. In response, the VP executes the micro-code corresponding to the instruction and calculates the distortion measurement between the domain block and each of the range blocks to be selected from the range area stored in the memory associated with the VP. The smallest distortion measurement is then used to identify the range block which best corresponds with the domain block and the corresponding motion vector for that range block and distortion measurement is provided to the RISC processor. The RISC processor then performs an entropy encoding of the affine map codes corresponding to the motion vector and computes a cost. This cost is compared to the cost computed for the no motion search and the affine map codes corresponding to the least cost are selected as representing the domain block pending a check of the threshold and cost for the best correspondence performed by the checkerboard search, if one is performed.

To perform the checkerboard search in the preferred embodiment, the RISC processor computes the left-most, upper-most pixel coordinates for the origin of the range area and provides that origin to the DMA controller. The DMA controller transfers the range area to the memory associated with the VP. The RISC processor then provides the VP with the instructions for comparing the domain block to the range blocks in the checkerboard range area. In response, the VP executes the micro-code corresponding to the instruction and calculates the distortion measurement between the domain block and each of the range blocks to be selected from the range area stored in the memory associated with the VP. The smallest distortion measurement is then used to identify the range block which best corresponds with the domain block and the corresponding motion vector for that range block and distortion measurement is provided to the RISC processor. Most preferably, the RISC processor supplies the coordinates for the range area, one third of the range area at a time. This is done in the most preferred embodiment because the memory limitations of the VCP do not permit the loading of the entire range area defined by corresponding domain block location in the previous frame buffer with a preferred range area radius of 24 pixels. Since the searching of the range blocks within the checkerboard range area is performed one third at a time, the RISC processor computes a cost for the motion vector returned after the first third of the checkerboard range area is searched and compares it to the cost for the codeword representing the motion vector returned after the pass through the second third of the checkerboard area. The motion vector having the lowest cost is retained and compared to the cost of the codeword for representing the motion vector returned after the last third of the checkerboard area is performed. In this manner, the RISC processor has a cost for the no-motion search, local search, and checkerboard search, if performed, so the optimal codeword for the level 0 domain block may be selected.

The level 1 search for the Y component is shown in more detail in FIG. 9. The process for the level 1 search begins by segmenting the level 0 domain block into a plurality of level 1 domain child blocks and a distortion measurement is computed for each domain child block (block 150). Preferably, these blocks are each one quarter of the size of the domain block and do not overlap. The first domain child block is selected and the mean pixel difference between the domain child block and a corresponding range child block in the previous frame buffer is computed along with the cost for the codeword which represents the mean pixel difference and a no motion vector (block 152). The process then checks to see if another domain child block should be processed (block 154) and calculates the mean pixel difference, the corresponding map codes, and the cost for the corresponding codeword to represent the map codes for each domain child block of level 1. The process continues by defining a level 1 range area in the previous frame buffer for one of the domain child blocks and each block within that range area is compared to the domain child block (block 158). The search includes determining a distortion measurement for each block comparison. The search selects the domain child block/level 1 range block combination having the smallest distortion measurement as the best correspondence for the domain child block. The map codes representing the motion vector corresponding to the domain child block/level 1 range block having the smallest distortion measurement is selected and the cost for codeword representing the map codes is computed. This search is performed for each domain child block (block 160) until all of the blocks have been searched. The cost for the codeword representing the motion vector alone is compared to the cost for the codeword for the mean difference and no-motion vector and the codeword having the lowest cost is selected for representing the domain child block (block 162).

In the preferred embodiment of the present invention, the process shown in FIG. 8 is performed by the transfer of a level 1 mean calculation instruction from the RISC processor to the VP. In response, the VP executes the micro-code which causes the VP to sum the pixel difference between a domain child block and range block, compute the mean value of the sum, quantize the sum and return it to the RISC processor. Quantizing the sum is an operation in which the last two bits of the sum are removed since preferably, the mean difference is expressed in increments of four (4). The RISC processor then determines the codeword for the mean level and no-motion vector for each domain child block and the corresponding cost. The RISC processor sends to the DMA controller the origin of the level 1 range area and the pixel elements for the level 1 range area are transferred to the memory associated with the VP. The RISC processor then passes the instruction for a no-q search and, in response, the VP executes the corresponding micro-code. The blocks within the level 1 range area are then compared to the domain child block to determine the corresponding distortion measurement for each domain child block/level 1 range combination. The least distortion measurement and corresponding motion vector is returned to the RISC processor. The RISC processor determines the corresponding codeword and the cost for that codeword. After the level 1 range areas for each domain child block have been transferred to the memory associated with the VP and the VP used to determine the best correspondence for the domain child block, the RISC processor selects the codeword for each domain child block based upon the lowest cost.

Figure 10:
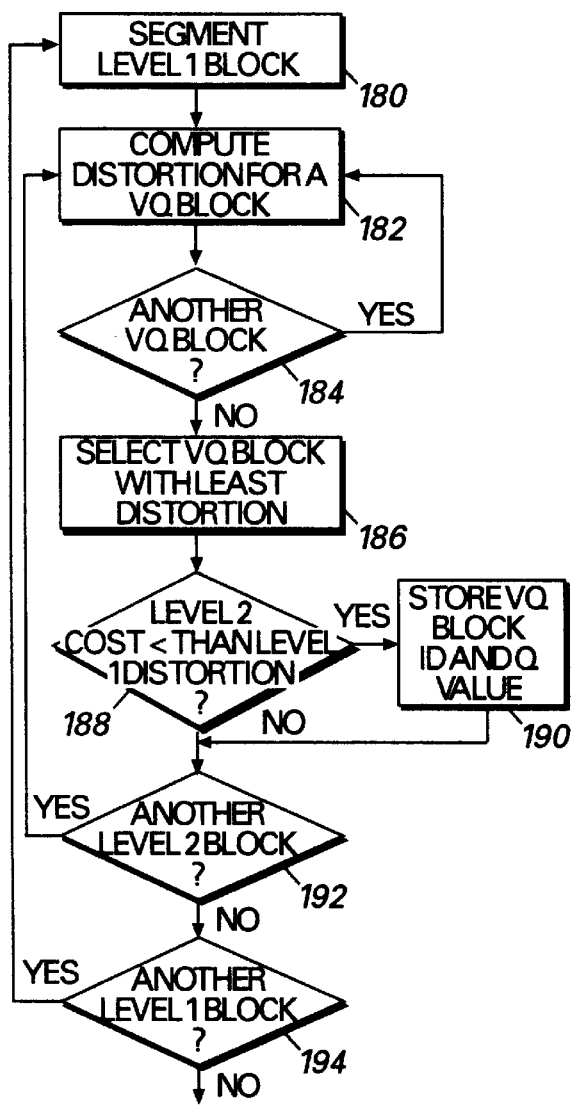
FIG. 10 is a flowchart of the preferred process for performing the level 2 search for the Y component shown in FIG. 6.

The process for the level 2 search for the Y component (block 92, FIG. 6) is shown in more detail in FIG. 10. The process begins by segmenting one of the domain child blocks into domain child sub-blocks and compute the distortion measurement each domain child sub-blocks (block 180). Preferably, the domain child sub-blocks are non-overlapping quadrants of the domain child block, although other subdivisions of the domain child block are within the principles of the present invention. The mean pixel value is computed by summing all of the pixel values and dividing by the number of pixels. The mean pixel value is quantized by removing the least significant two bits because the mean value is preferably expressed in increments of four. This mean value is subtracted from each pixel element. The domain child sub-block is then compared to each block of a VQ table to determine a distortion measurement (block 182). The comparison is made between the domain child sub-block and each VQ block (block 184). The smallest distortion measurement between the domain child sub-block and the VQ blocks is used to select the VQ block which is the best correspondence for the domain child sub-block (block 186). The affine map codes representing this block include a VQ block identifier and the pixel mean value. The cost of the codeword representing the affine map codes for the VQ block is compared to the distortion measurement for the child domain block (block 188). If the cost of the codeword for the VQ block is less than the distortion measurement for the child domain block, the codeword for the VQ block is stored (block 190) and a check is made to determine whether additional domain child sub-blocks exist for the selected domain child block which have not been processed (block 192). When all of the domain child sub-blocks for a domain child block have been processed, the process determines whether additional domain child blocks need to be segmented (block 194). If additional domain child blocks remain, the process continues by segmenting them into domain child sub-blocks and the process continues. Otherwise, the process continues as shown in FIG. 6. Alternatively, level 2 range blocks in the previous frame buffer may be mean corrected with a mean pixel difference for each range block and a distortion measurement computed between the level 2 block and each level 2 size range block. The smallest distortion measurement may be used to select the best correspondence and affine map codes. Another alternative is to compute the mean pixel value for a level 2 block and its corresponding level 2 size block at the no motion vector location and compute the cost of a codeword to represent the no motion vector and mean pixel value. A local search may then be performed for the level 2 block and the least distortion measurement used to select a best correspondence. The cost of the codeword for the local search may then be compared to the cost for the no motion vector and mean pixel value codeword and the least cost codeword selected.

In the preferred embodiment of the present invention, the RISC processor provides the address coordinates for the VQ blocks to the DMA controller which downloads the VQ blocks into the VP memory. The RISC processor then sends a level 2 search instruction to the VP processor. In response, the VP processor executes the corresponding micro-code and determines a distortion measurement between the indicated domain child sub-block and each VQ block. The smallest distortion measurement and corresponding VQ block identifier and q value are returned to the RISC processor. The RISC processor uses these values to determine a codeword and its corresponding cost which is then compared to the distortion measurement previously stored for the domain child block. The RISC processor continues to send level 2 search commands to the VP processor until all of the domain child sub-blocks for each domain child block have been processed.

Figure 11:
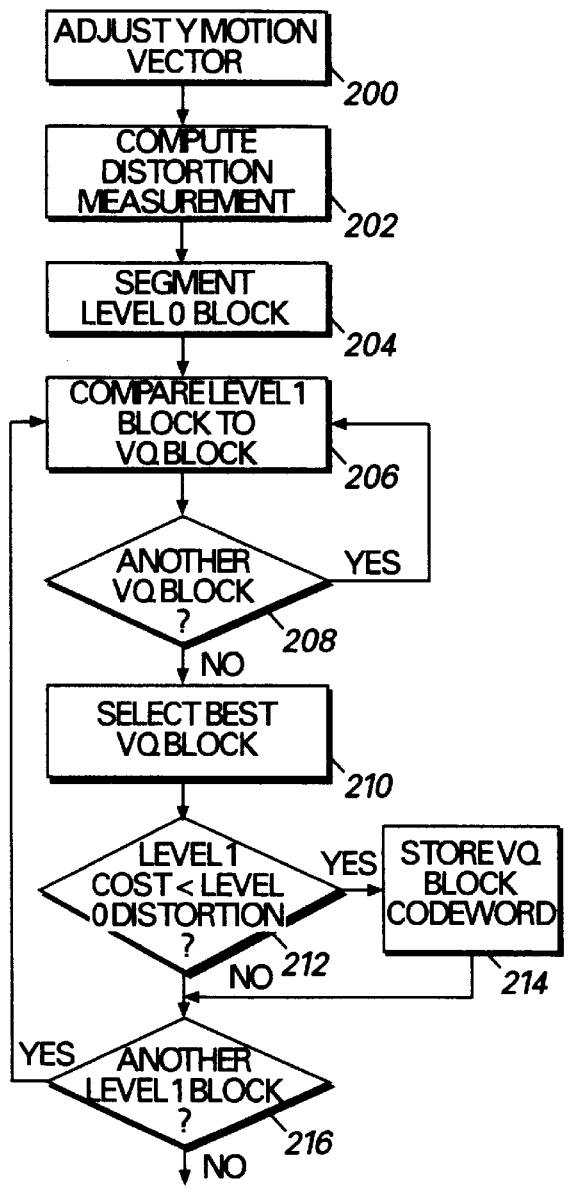
FIG. 11 is a flowchart of the preferred process for performing the level 0 and level 1 search for a U or V component shown in FIG. 6.

The level 0 search for the U and V components are shown in more detail in FIG. 11. That process begins by adjusting the motion vector used to represent the corresponding domain block in the Y component (block 200). Preferably, this adjustment is the division of the motion vector for the Y component domain block by preferably shifting the motion vector right one bit position. The range block corresponding to the origin identified by this motion vector is then compared to the U or V component domain block and a distortion measurement determined (block 202). The distortion measurement is compared to a threshold to determine whether a level 1 search should be performed (block 204). If the threshold is exceeded, the level 0 block is then segmented into a plurality of level 1 blocks and the distortion measurement for each level 1 block is computed (block 206). Each of those level 1 blocks is compared to the VQ blocks stored in a VQ table for the corresponding U or V component (blocks 208). The VQ block corresponding to the smallest distortion measurement is used to select a VQ block identifier and associated mean value(block 210). The VQ block identifier and its corresponding mean value are used to determine a codeword for each level 1 block. The cost for each codeword for the level 1 blocks is compared to the distortion measurement for the portion of the level 0 block which corresponds to the level 1 block (block 212). If the cost of the level 1 block is less, its affine map codes are added to the set of affine map codes which represent the level 0 block (block 214). Otherwise, it is discarded. If all of the codewords which represent level 1 blocks are selected, the codeword for the level 0 block is discarded. The process continues until all of the level 1 blocks have been processed (block 216).

Because each level block may be further subdivided with some of the child blocks resulting in further subdivision, a shape map identifying which blocks are further subdivided is preferably provided in the data representation of a parent block. In the preferred embodiment, a four bit hexadecimal number is used to identify the child blocks which are further divided. The preferred child block representation scheme is shown in FIG. 12. The "1" values indicate child blocks for which further subdivided blocks generate more efficient codes for representing the frame data. The "0" values indicate that the map codes for the current level block are sufficient to accurately represent that block of the video frame data.

FIG. 13 shows an example of a level 0 block for which level 1 and level 2 blocks have been identified as better representing a block in current frame buffer 16. The map codes for defining the content of each of these blocks may be organized as shown in FIG. 14A or as shown in FIG. 14B. Other methods for organizing the codewords and still identify the tree structure for the blocks may also be used. What is important is that decompressors 20 and 28 be programmed to parse the vectors transmitted to it in the same structure in which they are generated by compressor 12.

The codewords which define the affine map codes for representing a domain block have a format shown in FIG. 15. The color field is a code which indicates whether the Y, U or V component is described by the codeword. Preferably, the codeword for the color components are transmitted in the same order, namely Y followed by U followed by V. Thus, the color field is not necessary since the decompressor can determine the color for the next codeword by tracking the codewords transmitted thus far. By eliminating this field, bits are eliminated from the transmission. Likewise, the level field may be eliminated since the compressor transmits the codewords in the same order. The shape field is a bit map which defines which block of the next level has a codeword in the bit stream. A bit value of 1 indicates a codeword follows for that next level block and a bit value of 0 means no codeword follows for the next level block. If the shape field indicates that codewords follow for all of the blocks of the next level, there is no value for the X, Y, and q fields for the current level. This means that the codewords for the next four levels can be provided in a bit length which sufficiently improves the accuracy of the representation without requiring too many bits for the codewords. For any level which a codeword representing a motion vector is transmitted, the X and Y value of the motion vector is transmitted in the X and Y fields of the codeword. For level 2 blocks in the Y component and level 1 in the U and V components, the X value is preferably 0 since only the Y field is necessary to define the vector identifier for the corresponding VQ block. Also, for U and V level 0 blocks, the X and Y fields need not be transmitted since they can be calculated from the motion vector for the corresponding Y component domain block. The q field defines a value which is to be added to each pixel of a VQ block to form a block for the regenerated frame buffer. Since q is not computed for the level 0 blocks for all color components and for the level 1 block of the Y component having a motion vector, there is no value to be transmitted in the q field for these blocks. The q value for any VQ block or level 1 Y component block with a no motion vector is provided in the q field and is preferably expressed as an integer in the range of −128 to 124 in increments of 4.

As discussed above, the process includes determining the cost of a codeword and using the cost of codewords within a level to determine the best codeword to represent the block at that level. For example, the cost of the codeword determined by the no-motion search, the codeword determined by the local search, and the codeword determined by the checkerboard search at level 0 for the Y component are compared and the lowest cost is used to select the codeword which represents the domain block at that level. This cost is calculated according to the formula:

$$\text{cost} = d \times \text{divisor} + \text{length} \times \lambda$$

Where d is the distortion measurement, divisor is a fixed constant which preferably is a power of 2 so the multiplication can be implemented with a shift left operation; length is the length in bits of the codeword returned by the entropy encoder; and $\lambda$ is a multiplier that corresponds to the number of bits contained in the codewords generated for the frame. The $\lambda$ multiplier is updated at the start of the process for each level 0 domain block of the Y component. The $\lambda$ computed for the domain block in the Y component is also used to process the domain blocks of the corresponding U and V components. This regulation of $\lambda$ is preferred since it improves the convergence of the chrominance to the luminance. Prior to the compression of the frame, the following initial values are set:

target frame size=bit rate÷frame rate;

remaining bits=target frame size;

coefficients [0 . . . (number of domain blocks −1)]=70,000;

total coefficients=70,000×number of domain blocks;

$\lambda$=total coefficients/target frame size;

The array of coefficients is initialized to 70,000 as an arbitrarily large value which was selected based on empirical performance of the system. Other values of coefficients may be used within the principles of the present invention. Prior to each domain block in the Y component being processed, the following parameters are updated:

block size=number of bits used for the codewords of the previous domain block;

remaining bits=remaining bits—block size;

old coefficient=coefficients [domain block number−1];

coefficients [domain block−1]=block size×$\lambda$;

total coefficients=total coefficients—old coefficient;

$\lambda$=total coefficients+(((coefficients [domain block number−1]—old coefficient)×(total coefficients/old coefficient))/2);

$\lambda$=$\lambda$/remaining bits;

For the first row of domain blocks processed in the Y component, $\lambda$ is allowed to change in accordance with the above equations. For the second and subsequent rows in the frame, the change in λ is limited to a change which is within 10% of the previous value for λ used for the prior domain block. For all calculations of λ, λ is preferably restricted to the range of 10 to 5,000 for the preferred divisor of $2^6$, although a larger upper bound of the range is permissible with a larger divisor. This restriction keeps λ in a range where a large amount of bits are not expended on the representation of early domain blocks to the detriment of codewords used to represent the domain blocks later processed in the frame and to keep image quality more consistent from frame to frame.

At the start of each frame, the remaining bits and total coefficients variables are updated as follows:

remaining bits=remaining bits+target frame size;
total coefficients=sum (coefficients [0 . . . (number of domain blocks−1)]);

The value for λ for the first block of the next frame is the value of λ used for the last domain block of the previous frame. At the end of each frame, the remaining bits variable may be negative if more bits are spent on codewords than the target size or positive if less bits were spent than the target size. If the remaining bits variable is negative, the calculations noted above cause the codewords generated for the next frame to be further constrained in a effort to equalize the bit rate from frame to frame. Likewise, if the remaining bits are positive, the next frame is able to expend more bits than the initial target frame size. The target frame size is restricted to a value within 10% of the initial target frame size to maintain constant frame rate.

The VQ blocks stored in the VQ tables of the present invention are used as reference blocks for finding a best correspondence for 4×4 pixel blocks. This size pixel block corresponds to domain child sub-blocks for the Y component and to domain child blocks for the U and V components. The VQ blocks are preferred since the downloading and comparison with these blocks significantly reduces the computational requirements for determining the affine map codes for blocks having the same size as the VQ blocks.

The VQ blocks used in the present invention are generated from a process that uses a Winning-Weighted Competition Learning (WWCL) algorithm and a Linde-Buzo-Gray (LBG) algorithm. Preferably, the VQ blocks are generated by selecting a statistically significant set of 4×4 blocks from a plurality of video sequences. Most preferably, the video sequences are Mother and Daughter, Trevor, Susie, Carphone, Foreman, Miss America, Salesman, Claire, and Grandma. These video sequence titles are well known to those of ordinary skill in the art. The mean pixel value is subtracted from each pixel of the selected blocks to constrain the pixel values to the range of −128 to +127 for computational simplicity. The blocks are then separated into the three color components, YUV, and the blocks to be used in the tables for each color component are determined separately.

For the U and V components, the blocks for a color component are processed using the WWCL algorithm to determine a set of thirty-two blocks for the color component which are evaluated to have a relatively high degree of probability of being similar to blocks in any video sequence which may be compressed. Preferably, the coefficients used in this algorithm are $\alpha_0=0,01$, $\gamma_0=0,239$ and $\eta_0=0.005$. These coefficient symbols for this algorithm are well known. This processing is used to obtain a initial table which is then improved by the LBG algorithm. The selected blocks for the color component are then processed using the LBG algorithm to adjust the pixel values of the blocks in the initial table to improve the likelihood that the blocks correspond well to the selected blocks. This process is performed iteratively until the change in the blocks from one iteration to the next is mathematically insignificant. This process is performed on the selected blocks to select a table of VQ blocks for both the U and V components.

For the Y component, the process begins by computing a DCT transformation for the Y component blocks of the selected blocks. This transformation makes the extraction of edge information easier. Preferably, the blocks of a VQ table should not be smooth since a best correspondence for a smooth domain block is probably found in one of the searches comparing current frame blocks to previous frame blocks. A standard DCT transformation relation is shown in FIG. 16 (page 6 of Gang disclosure). Preferably, four DCT coefficients, $C_{01}$, $C_{02}$, $C_{10}$, $C_{20}$, are selected for each Y component block selected from the video sequences to form a vector for each block. These DCT vectors may be used to classify the blocks for a set of subcodebooks as used in a classical vector quantization (CVQ) system. Such a system is shown in FIG. 17 (page 5 of Gang disclosure). Preferably, the WWCL algorithm is used to process the selected vectors of the Y component to obtain a initial set of ten classes for a classifier. All of the selected blocks are then classified in accordance with these ten classes. The size of each subcodebook is set to 16 and the WWCL algorithm is used to obtain an initial table of sixteen blocks for each class. These initial tables are combined to provide a table of 160 blocks. From this set, 90 blocks are selected by eliminating smooth blocks to generate an initial table of VQ blocks. This table is processed using the LBG algorithm to adjust the blocks to generate a table of VQ blocks used for searching domain child sub-blocks of the Y component of the present invention. After operation of the compressor, blocks which are not frequently used may be detected. These blocks may be eliminated from the VQ table and replaced with blocks from the group of 70 previously discarded. The compressor may then be operated and use of the VQ table monitored and adjusted, if desired.

The VQ table of the present invention is preferably comprised of 90 blocks because the size limitations of the internal memory of the VP in the preferred DCT processor so limit it. Other VQ table sizes may be used if memory constraints so permit. The relative smoothness of the U and V components make additional blocks beyond 32 in number unnecessary. In fact, computational inefficiencies have been noted with table sizes much larger than 32. The sum of absolute differences was used in the WWCL and LBG algorithm implementations to determine the VQ blocks of the present invention because that distortion measurement is supported by the DCT processor of the preferred embodiment. Other distortion measurements may be used if supported by the compressor of a system.

Between frames, the compressor of the present invention may be placed in a half-frame mode of operation. The compressor remains in this mode until it is changed to full frame operation. If the compressor is placed in half-frame mode, the decompressor must be placed in the same mode. Otherwise, the decompressor does not accurately decompress codewords. This technique decreases the size of the frames that are compressed to permit a higher frame rate. This process is performed by interpolating a 176 by 64 pixel element frame from a 176 by 128 pixel element frame. The 176 by 128 pixel element frame is obtained by dropping the last 16 lines of a QCIF image and the interpolated frame is obtained by using a 7-tap filter. The 5 and 7 tap filter available on the DCT processor of the preferred embodiment is used for reducing the horizontal size of a frame. Since half-frame mode is a vertical reduction, the 7-tap filter is preferably implemented in microcode loaded into the SRAM memory of the VP processor. The operation of a 7 tap filter are well known in the field. Briefly, each of seven adjacent pixels in a column is each multiplied by a coefficient, summed and divided by the sum of the coefficients to generate a pixel value for the interpolated frame. The next group of seven pixels is selected by going down two pixels and selecting the next seven adjacent pixels in the column. Alternatively, a five tap filter, averaging of adjacent pixels in a column, or removing alternating rows may be used to generate the interpolated frame. The preferred coefficients for the 7 tap filter are: $C_1=-14, C_2=0, C_3=44, C_4=70, C_5=44, C_6=0, C_7=-14$. The divisor preferably used is 128 to determine the pixel value since it approximates the sum of these coefficients and is a power of 2. The interpolated frame may also be obtained by pixel averaging rows of pixels in the U and V components.

The reduced frame is then compressed in accordance with the process described above with respect to FIGS. 6 through 10. Use of the domain block sizes noted above on the reduced frame size reduces the compression time per frame by more than half and accordingly, the achievable frame rate is doubled. At the decompressor, the regenerated frame is 176 by 64 pixels and is vertically increased by a factor of 2 using line doubling, filtering in the DCT compressor of the preferred embodiment or some other scaling technique to generate the expected size for the display. While the filtering performed in the half-frame mode reduces image quality, it permits significantly higher frame rates.

The process for decompression of the codewords to regenerate image is shown in FIG. 18. The process begins by receiving codewords for a domain block from compressor 12 (block 300). These codewords are unpacked using a Huffman decoder to recover the affine map codes (block 304). A block, either in the regenerated frame buffer or the VQ table, is identified by the map codes. The motion vector for the identified block is used to move pixels from the identified VQ block or regenerated frame buffer block into a current frame buffer (block 306). If pixel elements for a VQ block or a level 1 block for a Y component without a motion vector are being moved, the pixel values are adjusted by the q parameter prior to moving the pixel elements into the current frame buffer. After all the codewords for all of the domain blocks have been processed (block 308), the current frame buffer contains the pixel elements of the regenerated frame. This frame may then be provided to an output for display (block 310) or storage and the contents of the current frame buffer used to update the regenerated frame buffer (block 312).

In use, the system 10' is installed at a site for compressing a sequence of related data sets. At a site where the related data sets are video frames of a video sequence, operation of the compressor begins by setting all of the pixel elements of the previous frame buffer to a gray value, which is preferably zero. The frame rate, bit rate and half-frame mode parameters for the video sequence generator are known and those values are used to initialize the parameters associated with the bit rate calculations discussed above. As video frames are generated by the video generator, they may be preprocessed by components outside the DCT processor or, as in the preferred embodiment, components onboard the DCT processor may be used to filter and preprocess the frames prior to placing them in the current frame buffer. After a frame has been placed in the current frame buffer, compressor 12 initiates compression of the Y component of the frame by selecting a first domain block from the Y component and performing the level 0, 1, and 2 searches according to the process set forth above. If a do nothing code is used to represent the domain block, the U and V components are preferably not processed. The code words for the Y, U and V components are then transmitted to a remote site. The affine map codes selected for the domain block are also used to generate a decompressed image which is stored in the target buffer.

If a do nothing code is not used for the domain block, the resulting affine map codes for the Y component domain block are encoded using the entropy encoder of the DCT processor prior to being transmitted to the remote site. Preferably, the entropy encoder is a Huffman encoder implemented in the program memory of the process controller. After the domain block of the Y component is processed, the corresponding domain block for the U and V components are also processed. The process continues compressing the frame by compressing the domain blocks in the order of Y, U, and V components. After a frame is compressed, the buffer pointers are switched to identify the target buffer as the previous frame buffer and the previous frame buffer as the target buffer.

At the remote site, the regenerated frame buffer of the decompressor is initialized to a gray scale value corresponding to the pixel intensity value scheme used at the decompressor. The receiver receives encoded codewords and provides them to the decompressor. The decompressor decodes the codewords to generate the affine map codes which are then used to move and adjust as required by the map codes pixel elements from the regenerated frame buffer or the VQ tables to generate a current frame. The current frame may then be output for use at the remote site and this regenerated frame loaded into the regenerated frame buffer for use to decompress the next frame. As frames are received and decompressed, the pixel elements in the previous frame buffer and regenerated frame buffer of the compressor and decompressor, respectively, converge to pixel elements which approximate the current frame being compressed.

At any time between frames during the compressor operation, a signal may be generated which places the compressor and decompressor into a half-frame operation mode. In this mode, the current frame is interpolated into an interpolated QCIF frame size and the previous frame buffer is initialized to the gray scale value. Likewise, the decompressor initializes its regenerated frame buffer to the initial gray value. Thereafter, the compressor compresses the interpolated QCIF frames according to the process set forth above and the decompressor operates to decompress the codewords into interpolated QCIF size frames. These frames are then vertically scaled to the 176×128 frame size.

While the present invention has been illustrated by a description of preferred and alternative embodiments and processes, and while the preferred and alternative embodiments processes have been described in considerable detail, it is not the intention of the applicants to restrict or in any way limit the scope of the appended claims to such detail. Additional advantages and modifications will readily appear to those skilled in the art.

What is claimed is:

1. A method for compressing related sets of data comprising the steps of:

performing a local search to compare a first set of range blocks from a range area in a previous frame buffer to a domain block;

performing a checkerboard search to compare a second set of range blocks from a range area in said previous frame buffer to said domain block;

determining a first cost of coding a best correspondence between a range block from said first set and said domain block;

determining a second cost of coding a best correspondence between a range block from said second set and said domain block; and selecting a set of codes to represent said domain block, said selected set of codes corresponding to said best correspondence having a least cost.

2. The method of claim 1 wherein said determining step and said selecting steps are performed by a discrete cosine transfer (DCT) processor.

3. The method of claim 1 further comprising the steps of:

performing a no motion search to compare a no-motion range block from said previous frame buffer to said domain block; and determining the no motion cost of coding said domain block with reference to said no-motion block.

4. The method of claim 1 wherein said domain block is a Y component domain block and further comprising the steps of:

determining a best correspondence between a domain block of a second color component in said current frame and a block in a second buffer for said second color component; and selecting a set of affine map codes corresponding to said determined best correspondence for representing said domain block in said second color component.

5. The method of claim 4 further comprising the steps of:

adjusting a motion vector from said set of affine map codes for said domain block of said Y component; and selecting a range block in said second buffer of said second color component to compare with said domain block of said second color component.

6. The method of claim 1 further comprising the steps of:

segmenting said domain block into domain child blocks;

determining a best correspondence for said domain child blocks and a block in said previous frame buffer;

computing a distortion measurement between each domain child block and a portion of said domain block corresponding to said domain child block;

computing a pixel mean difference for each said domain child block;

comparing a cost of a set of affine map codes for each pixel mean difference and a cost of a set of affine map codes for said best correspondence for said domain child block; and selecting one of said sets of affine map codes to represent said domain child block that corresponds to said least cost.

7. The method of claim 6 wherein said cost is a sum of a product of said distortion measurement and a normalization factor and a product of a length of a codeword and a bit rate multiplier.

8. The method of claim 6 farther including the steps of:

interpolating said current frame to a reduced size prior to said determining step.

9. The method of claim 6 further comprising the steps of:

segmenting said domain child block into domain child sub-blocks;

computing a distortion measurement between each domain child sub-block and a portion of said domain child block corresponding to said domain child sub-block;

computing a pixel mean difference for each said domain child sub-block;

comparing a cost of a set of affine map codes for each pixel mean difference and a cost of a set of affine map codes for said best correspondence for said domain child sub-block; and selecting one of said sets of affine map codes to represent said domain child sub-block that corresponds to said least cost.

10. The method of claim 9 further comprising the steps of:

computing a mean pixel value for each said domain child sub-block;

adjusting said domain child sub-block by subtracting said mean pixel value from each pixel in each said domain child sub-block;

comparing said adjusted domain child sub-block to a plurality of VQ blocks; and selecting affine map codes for said domain child sub-block corresponding to a domain child sub-block/VQ block combination having a smallest distortion measurement.

11. The method of claim 10 further comprising the steps of:

computing a cost for said affine map codes for said domain child sub-block;

comparing said cost for said domain child sub-block to said distortion measurement between said domain child block and its corresponding portion of said best correspondence for said domain child block; and including said affine map codes selected for said domain child sub-blocks in said set of affine map codes for representing said domain child block in response to said cost being less than said distortion measurement.

12. The method of claim 11 further comprising the steps:

replacing said set of affine map codes with a do nothing code in response to said cost for said do nothing code being less than said cost for said set of affine map codes.

13. The method of claim 12 wherein said replacing step is performed for a domain block of a first color component of said current frame; and determining a best correspondence for a next domain block of said first color component without determining a best correspondence for a second color component.

14. The method of claim of claim 11 further comprising the steps of:

computing a sum of costs for said selected affine map codes for one of said domain child blocks and said selected affine map codes for said domain child blocks corresponding to said one of said domain child blocks;

comparing said distortion measurement between said one of said domain child block and said corresponding portion of said best correspondence for said domain block and said computed costs; and selecting said affine map codes for said domain child and said domain child subblock to be included in said set of affine map codes in response to said computed cost being less than said distortion measurement.

15. The method of claim 14 further comprising the steps of:

determining all said affine map codes for said domain child sub-blocks are included in said set of affine map codes; and deleting said affine map codes for said domain child block from which said domain child sub-blocks are segmented.

16. The method of claim 15 further comprising the steps of:

determining all said affine map codes for said domain child blocks are included in said set of affine map codes; and deleting said affine map codes for said domain block from which said domain child blocks are segmented.

17. The method of claim 16 further comprising the steps of:

updating a bit rate multiplier in correspondence with a number of bits for codewords representing said set of affine map codes.

18. The method of claim 17 wherein said bit rate multiplier is restricted to a predefined amount of change.

19. The method of claim 18 further comprising the steps of:

applying a vertical 7 tap filter to said current frame to interpolate said frame to said reduced size.

20. A method for compressing data comprising a luminance/chrominance (YUV) image comprising the steps of:

segmenting a luminance (Y) component of a current frame into a plurality of domain blocks;

processing a first domain block of said Y component to determine distortion measurements between said first domain block and one of a range block and a vector quantization (VQ) block in a VQ table;

determining costs for affine map codes corresponding to domain block/range block combinations and domain block/VQ block combinations;

selecting a set of affine map codes to represent said first domain block of said Y component, said selected set corresponding to a least cost;

selecting said affine map codes to be a do nothing code in response to a cost for a do nothing code being less than said cost for said set of affine map codes for domain block/range block combinations and domain block/VQ block combinations which represent said domain block; and determining said set of affine map codes for said first domain block of said chrominance components (U and V) to be do nothing codes in response to said set of affine map codes for said first domain block of said Y component being a do nothing code.

21. The method of claim 20 further comprising the steps of:

processing a next domain block of said Y component to determine a set of affine map codes to represent said next domain block;

processing a next domain block of said U and V components to determine a set of affine map codes to represent said next domain block of said U and V components in response to said set of affine map codes for said next domain block for said Y component not being a do nothing code; and continuing to process domain blocks in said Y, U, and V components until a set of affine map codes for all domain blocks of all components of said image have been processed.

22. The method of claim 21 further comprising the steps of:

determining a least distortion measurement between said domain block in said current frame and a plurality of corresponding range blocks in a previous frame;

comparing said least distortion measurement to a threshold to determine whether a next level of said domain block is evaluated;

selecting said set of affine map codes corresponding to said domain block and range block combination to represent said domain block in response to said least distortion measurement being less than said threshold; and determining a level 0 cost for said set of affine map codes.

23. The method of claim 22 further comprising the steps of:

segmenting said domain block comprising said next level into domain child blocks;

determining a best correspondence for said domain child blocks and a block in said previous frame buffer;

computing a distortion measurement between each domain child block and a portion of said domain block corresponding to said domain child block;

computing a pixel mean difference for each said domain child block;

comparing a cost of a set of affine map codes for each pixel mean difference and a cost of a set of affine map codes for said best correspondence for said domain child block; and selecting one of said sets of affine map codes to represent said domain child block that corresponds to said least cost.

24. The method of claim 23 wherein said next level is comprised of four non-overlapping quadrants of said domain block.

25. The method of claim 24 further comprising the steps of:

comparing said distortion measurement for said domain child block to a threshold to determine whether a second level of said domain block is evaluated.

26. The method of claim 25 further comprising the steps of:

determining a best correspondence between a plurality of domain child sub-blocks comprising said second level of said domain block and a corresponding plurality of range child sub-blocks in said second level, said best correspondence for a domain child sub-block and a range child block corresponding to a lowest distortion measurement;

determining affine map codes for each best correspondence of said second level of said domain block; and determining a cost for each set of affine map codes for each best correspondence for said second level.

27. The method of claim 26 further comprising the steps of:

generating additional levels of said domain block;

determining best correspondences for blocks in said additional levels of said domain block;

selecting affine map codes for each best correspondence for each block in said additional levels;

computing a cost for said selected affine map codes; and terminating said level generating step in response to said blocks of a lower level having a size less than said predetermined minimum.

28. The method of claim 27 comprising the steps of:

selecting affine map codes for said best correspondences for said lowest level having a cost less than said distortion measurement for a portion of a previous level block corresponding to said lowest level block; and computing a sum of costs for said selected affine map codes for one of a preceding level block and said selected affine map codes for said lowest level blocks corresponding to said one of said preceding level block.

29. The method of claim 22 wherein said determining distortion measurement step further comprises the steps of:

selecting a set of no motion affine map codes for a domain block/range block combination corresponding to a no motion distortion measurement;

selecting a set of local search affine map codes for a domain block/local search range block combination corresponding to a best local search distortion measurement;

selecting a set of checkerboard affine map codes for a domain block/checkerboard search range block combination corresponding to a best checkerboard search distortion measurement;

selecting one of said sets of affine map codes corresponding to a least cost.

30. The method of claim 29, wherein said step of selecting said set of no motion affine map codes further comprises the steps of:

computing a distortion measurement between said domain block and said range block;

selecting a set of affine map codes corresponding to said distortion measurement; and determining a cost for said selected set of affine map codes.

31. The method of claim 30, wherein said step of selecting said set of local search affine map codes further comprises the steps of:

determining a local search range area in said reference frame;

selecting a local search range block in said local search range;

computing a distortion measurement between said domain block and said local search range block;

determining a distortion measurement between said domain block and each local search range block in said local search range area by selecting each local search range block in said local search area and computing said distortion measurement;

selecting a set of local search affine map codes for one of said domain block/local search range block combinations corresponding to a least distortion measurement;

determining a cost for said selected local search affine map codes; and comparing said cost for said selected set of local search affine map codes to said cost for said set of no motion affine map codes to determine whether said local search affine map codes are used to represent said domain block.

32. The method of claim 31, said step of selecting said set of checkerboard affine map codes further comprising the steps of:

determining a checkerboard range area in said reference frame;

selecting a checkerboard range block in said checkerboard range;

computing a distortion measurement between said domain block and said checkerboard range block;

determining a distortion measurement between said domain block and each checkerboard range block in said checkerboard range area by selecting each checkerboard range block in said checkerboard range area and computing said distortion measurement;

selecting a set of checkerboard affine map codes for one of said domain block/checkerboard range block combinations corresponding to a least distortion measurement;

determining a cost for said selected set of checkerboard affine map codes;

comparing said cost for said selected set of checkerboard affine map codes to said cost for said set of selected no-motion or local search affine map codes to determine whether said checkerboard affine map codes are used to represent said domain block.

33. The method of claim 32 further comprising the steps of:

segmenting said domain block into a plurality of domain child blocks;

computing a mean pixel difference for each domain child block;

computing a mean pixel distortion measurement for each said domain child block;

computing a cost for affine map codes for each mean pixel difference;

selecting a range area in said reference frame so that each domain child block has a corresponding range area;

measuring a distortion measurement between each domain child block and each range block in said range area corresponding to each said domain block;

determining a least distortion measurement for each domain child block and a corresponding cost for a motion vector corresponding to said domain child block/range child block combination having said least distortion measurement;

comparing, to determine a least cost, said cost for said affine map codes for each mean pixel difference for each said domain child block to said cost for said motion vector corresponding to said domain child block/range child block combination having said least distortion measurement; and selecting for each domain child block one of said affine map code for said mean pixel difference and said affine map code for said motion vector which corresponds to said least cost so that each domain child block is represented by one of said affine map codes.

34. The method of claim 33 further comprising the steps of:

segmenting said domain child blocks into a plurality of domain child sub-blocks;

computing a q parameter for each domain child sub-block;

computing a distortion measurement between each said domain child sub-block and each VQ block of a VQ table;

determining a least distortion measurement for each domain child sub-block;

selecting a VQ identifier and a q parameter corresponding to said block yielding said least distortion measurement;

computing a domain child sub-block cost corresponding to said VQ identifier and said q parameter for each said domain child sub-block;

comparing said domain child sub-block cost to said distortion measurement for a portion of said domain child block; and selecting said VQ identifier and said q parameter corresponding to said VQ block in said VQ table in response to said domain child sub-block cost being less than said distortion measurement for a portion of said domain child block corresponding to said domain child sub-block.

* * * * *